United States Patent
Conlon et al.

(10) Patent No.: US 12,157,169 B2
(45) Date of Patent: Dec. 3, 2024

(54) METAL POWDER-BASED MANUFACTURING PROCESS IN LOW IMPURITY GAS ATMOSPHERE AND SYSTEM

(71) Applicant: Equispheres Inc., Ottawa (CA)

(72) Inventors: Martin John Conlon, Ottawa (CA); Jonathan Phillips, San Juan Capistrano, CA (US); Sean Robert Doutre, Ottawa (CA); Kamran Azari Dorcheh, Kanata (CA); Abdullah Mohammad Khalid Hafiz, Ottawa (CA); James Bastien, Stittsviille (CA); Kenneth Gerald Johnson, Kanata (CA)

(73) Assignee: EQUISPHERES INC., Ottawa (CA)

(*) Notice: Subject to any disclaimer, the term of this patent is extended or adjusted under 35 U.S.C. 154(b) by 472 days.

(21) Appl. No.: 17/612,170

(22) PCT Filed: May 25, 2020

(86) PCT No.: PCT/CA2020/050704
§ 371 (c)(1),
(2) Date: Nov. 17, 2021

(87) PCT Pub. No.: WO2020/237359
PCT Pub. Date: Dec. 3, 2020

(65) Prior Publication Data
US 2022/0219242 A1     Jul. 14, 2022

Related U.S. Application Data

(60) Provisional application No. 62/852,621, filed on May 24, 2019.

(51) Int. Cl.
*B22F 12/70*     (2021.01)
*B22F 3/00*      (2021.01)
(Continued)

(52) U.S. Cl.
CPC ............ *B22F 3/10* (2013.01); *B22F 3/003* (2013.01); *B22F 9/08* (2013.01); *B22F 10/20* (2021.01);
(Continued)

(58) Field of Classification Search
CPC .......... B22F 10/14; B22F 10/18; B22F 10/20; B22F 10/25; B22F 10/28; B22F 10/32;
(Continued)

(56) References Cited

U.S. PATENT DOCUMENTS 4,629,407 A    12/1986 Amlinger
5,635,148 A     6/1997 Shadman
(Continued)

FOREIGN PATENT DOCUMENTS

CN    107695349 A    2/2018
EP     1211003 A2    6/2002
(Continued)

OTHER PUBLICATIONS

International Search Report and Written Opinion in related application PCT/CA2020/050704 dated Jul. 24, 2020.
(Continued)

*Primary Examiner* — Jenny R Wu
(74) *Attorney, Agent, or Firm* — Patterson + Sheridan, LLP

(57) ABSTRACT

A metal powder-based manufacturing system is provided and comprises: a sealed vessel defining a manufacturing chamber; a metal transformation/conversion unit contained in the manufacturing chamber and configured to heat a metal-based feedstock for transformation/conversion; an inert gas source in gas communication with the manufacturing chamber to supply inert gas therein, the inert gas source being operatively connected to the manufacturing chamber through an inert gas line; and at least one gas (Continued)

purifying unit in gas communication with the manufacturing chamber to purify the inert gas to obtain a purified inert gas having an oxygen partial pressure below about 100 ppb. A process for transforming/converting metal in a purified inert gas atmosphere.

13 Claims, 2 Drawing Sheets

(51) Int. Cl.
| | | |
|---|---|---|
| *B22F 3/10* | (2006.01) | |
| *B22F 9/08* | (2006.01) | |
| *B22F 10/20* | (2021.01) | |
| *B22F 10/32* | (2021.01) | |
| *B22F 10/85* | (2021.01) | |
| *B22F 12/10* | (2021.01) | |
| *B22F 12/90* | (2021.01) | |
| *B33Y 30/00* | (2015.01) | |
| *B33Y 40/00* | (2020.01) | |
| *B22F 10/14* | (2021.01) | |
| *B22F 10/18* | (2021.01) | |
| *B22F 10/25* | (2021.01) | |
| *B22F 10/28* | (2021.01) | |
| *B22F 10/77* | (2021.01) | |

(52) U.S. Cl.
CPC .............. *B22F 10/32* (2021.01); *B22F 10/85* (2021.01); *B22F 12/10* (2021.01); *B22F 12/70* (2021.01); *B22F 12/90* (2021.01); *B33Y 30/00* (2014.12); *B33Y 40/00* (2014.12); *B22F 10/14* (2021.01); *B22F 10/18* (2021.01); *B22F 10/25* (2021.01); *B22F 10/28* (2021.01); *B22F 10/77* (2021.01); *B22F 2201/11* (2013.01); *B22F 2201/12* (2013.01)

(58) Field of Classification Search
CPC .......... B22F 10/64; B22F 10/77; B22F 10/85; B22F 12/10; B22F 12/70; B22F 12/90; B22F 2201/11; B22F 2201/12; B22F 2203/03; B22F 2998/10; B22F 2999/00; B22F 3/003; B22F 3/10; B22F 9/08; B22F 9/082; B33Y 30/00; B33Y 40/00; B33Y 50/02; Y02P 10/25
See application file for complete search history.

(56) References Cited

U.S. PATENT DOCUMENTS

| | | |
|---|---|---|
| 5,902,561 A | 5/1999 | Carrea et al. |
| 2002/0125591 A1 | 9/2002 | Jaynes et al. |
| 2006/0249022 A1 | 11/2006 | Jaynes et al. |
| 2014/0165648 A1 | 6/2014 | Ha et al. |
| 2015/0056113 A1 | 2/2015 | Srivastava et al. |
| 2016/0045981 A1 | 2/2016 | Zurecki et al. |
| 2016/0207147 A1 | 7/2016 | Van Hassel |
| 2017/0239730 A1 | 8/2017 | Shirakawa et al. |
| 2017/0304945 A1 | 10/2017 | Sutcliffe |
| 2018/0117675 A1 | 5/2018 | Foret et al. |

FOREIGN PATENT DOCUMENTS

| | | |
|---|---|---|
| EP | 3189915 A1 | 7/2017 |
| EP | 3281726 A1 | 2/2018 |
| KR | 20180004350 A | 1/2018 |

OTHER PUBLICATIONS

International Preliminary Report on Patentability in related application PCT/CA2020/050704 dated May 25, 2021.
Reponse to Written Opinion in related application PCT/CA2020/050704 dated Mar. 23, 2021.
Extended European Search Report in related application EP 20813366 dated Jun. 2, 2023.
Office Action in related application CN 202080037354.4 dated Jul. 20, 2023 (including partial English translation attached).

METAL POWDER-BASED MANUFACTURING PROCESS IN LOW IMPURITY GAS ATMOSPHERE AND SYSTEM

CROSS-REFERENCE TO RELATED APPLICATIONS

This application claims priority under 35USC § 119(e) of U.S. provisional patent application 62/852,621 filed on May 24, 2019, the specification of which is hereby incorporated by reference.

TECHNICAL FIELD OF THE INVENTION

The technical field generally relates to systems for metal powder-based manufacturing with a manufacturing chamber having a low impurity gas atmosphere. More specifically, it relates to metal powder-based manufacturing systems, including metal-based powder manufacturing, powder metallurgy, and additive manufacturing systems, wherein a metal-based feedstock is heated close to or above its melting point, and then cooled down or solidified in order to create a desired final 3D shape or object. It also relates to a process for metal powder-based manufacturing in a low impurity gas atmosphere.

BACKGROUND

Several manufacturing processes exist wherein metal is heated close to or above its melting point, and then cooled down or solidified in order to create a desired final 3D shape or object, such as individual powder particles or a consolidated bulk form. In advanced metal-based manufacturing, these processes can include metal-based powder manufacturing where metal-based powder particles are produced from a metal-based source material, powder metallurgy wherein the metal-based powder particles are sintered into a consolidated bulk form, and additive manufacturing (AM) wherein the metal-based powder particles are melted/sintered/agglomerated to produce a consolidated bulk form.

These manufacturing processes frequently use oxidation-sensitive metals such as Al, Ti, reaction-sensitive alloys such as, and without being limitative, Zn, Cu, Fe, Li, Ni, Au, Pd or Ag, and other metal alloys, such as, and without being limitative, steel or other iron alloys, SnPb, NdFeB, ZnPd, CoCr, brass-based alloys and copper-based alloys. Consequently, reduction or elimination of $O_2$, $H_2O$, $CO_2$, CO, $H_2$ and total hydrocarbons (THC) during the manufacturing process is desirable.

Typically, the manufacturing process is carried out in an inert gas atmosphere, such as argon or helium-based atmosphere. However, even though these are inert gases, they have an impurity content (oxygen, nitrogen, and other non-metallic elements). The impurity content of the inert gas may affect the productivity and the yield of the manufacturing process as well as the quality of the manufactured metal part, either individual metal-based powder particles or consolidated bulk forms. There exist multiple third-party declarations of inert processing which do not identify the level of inertness and the term is universally inexact. For example, such heated metal-based manufacturing systems operate at levels of purity in a ppm (parts per million) order.

For instance, in the production of metal-based powder particles for additive manufacturing or powder metallurgy, the inert gas contaminants can lead to oxide film and/or inclusion formation, gas porosity and adsorbed water in the metal-based powder particles. In the application of the source material, the resultant part may contain oxide or nitride inclusions as well as gas porosity.

Furthermore, impurities, such as oxygen, nitrogen and other non-metallic elements, are effective surface-active agents. Therefore, they have an effect (i.e. influence) on the shape of molten metal, including individual particles (as in atomization) or melt pools (as in additive manufacturing consolidation).

In view of the above, there is a need for higher purity atmosphere in metal powder-based manufacturing processes and systems, which would be able to overcome, or at least minimize, some of the above-discussed prior art concerns.

SUMMARY

The present invention is therefore aimed at addressing the above-mentioned shortfalls.

According to a general aspect, there is provided a metal powder-based manufacturing system, comprising: a sealed vessel defining a manufacturing chamber; a metal transformation/conversion unit contained in the manufacturing chamber and configured to heat metal for transformation/conversion; an inert gas source in gas communication with the manufacturing chamber to create an inert gas atmosphere therein, the inert gas source being operatively connected to the manufacturing chamber through an inert gas line; and at least one gas purifying unit in gas communication with the manufacturing chamber to purify the inert gas to an oxygen partial pressure below about 100 ppb. In an embodiment, the metal powder-based manufacturing system further comprises a vacuum unit in gas communication with the manufacturing chamber to create a substantial vacuum therein.

In an embodiment, the metal transformation/conversion unit is selected from the group including: a metal-based powder manufacturing unit, a powder metallurgy unit, and an additive manufacturing unit.

In an embodiment, the metal transformation/conversion unit is configured to melt a metal-based feedstock and solidify the melted metal into at least one resultant part.

In an embodiment, the inert gas source comprises at least one of an argon gas source, a nitrogen source, and a helium gas source.

In an embodiment, the metal powder-based manufacturing system further comprises a recirculatory scrubbing system including a gas purifying unit in gas communication with the manufacturing chamber through a closed-loop recirculation gas line.

In an embodiment, the metal powder-based manufacturing system further comprises a recirculatory scrubbing system including at least one of the at least one gas purifying unit in gas communication with the manufacturing chamber through a closed-loop recirculation gas line.

In an embodiment, at least one of the at least one gas purifying unit is in gas communication with the manufacturing chamber through the inert gas line, the gas purifying unit being located downstream of the inert gas source to purify inert gas supplied by the inert gas source to an oxygen partial pressure below about 100 ppb before being introduced into the manufacturing chamber.

According to another general aspect, there is provided a process for transforming/converting metal. The process comprises: withdrawing gas from a manufacturing chamber defined in a sealed vessel to a substantial vacuum and containing a metal transformation/conversion unit; supplying inert gas to a gas purifying unit to lower an oxygen partial pressure below about 100 ppb; introducing the purified inert gas into the manufacturing chamber under substantial vacuum; and heating metal with the metal transformation/conversion unit to transform/convert a metal-based feedstock into at least one resultant part.

According to another general aspect, there is provided a process for transforming/converting metal. The process comprises: monitoring an oxygen partial pressure in a manufacturing chamber defined in a sealed vessel, continuously: withdrawing gas from, purifying the withdrawn gas to lower its oxygen partial pressure, and reinjecting the purified gas into the manufacturing chamber, until the oxygen partial pressure is below about 100 ppb; and then heating metal with a metal transformation/conversion unit contained in the manufacturing chamber to transform/convert a metal-based feedstock into at least one resultant part.

According to still another general aspect, there is provided a process for transforming/converting metal. The process comprises: withdrawing gas from a manufacturing chamber defined in a sealed vessel to a substantial vacuum and containing a metal transformation/conversion unit; then, introducing inert gas into the manufacturing chamber; purifying the inert gas at least one of before introduction into the manufacturing chamber and following introduction into the manufacturing chamber to lower an oxygen partial pressure below about 100 ppb to obtain a purified inert gas; introducing the purified inert gas into the manufacturing chamber; and heating metal with the metal transformation/conversion unit to transform/convert a metal-based feedstock into at least one resultant part in the manufacturing chamber containing purified inert gas.

In an embodiment, the process further comprises maintaining an oxygen partial pressure inside the manufacturing chamber below about 200 ppb. The process can further comprise controlling the oxygen partial pressure inside the manufacturing chamber by recycling a percentage of a gas volume contained inside the manufacturing chamber in a closed-loop recirculation gas line including a recirculatory scrubbing system. Controlling the oxygen partial pressure inside the manufacturing chamber can comprise monitoring the oxygen partial pressure inside the manufacturing chamber and adjusting the percentage of the gas volume circulated in the closed-loop recirculation gas line.

In this specification, the term "heated metal-based manufacturing process and system" is intended to include any manufacturing process and system wherein a metal source (or feedstock) is heated close to or above its melting point, and then cooled down or solidified in order to create a desired final 3D shape/object or at least one resultant part.

The metal source/metal-based feedstock can either be in bulk form or in particle form. The at least one resultant part can be individual powder particles or any other suitable final 3D part/object. The terms metal and metal-based are intended to include pure metals, alloys, or metals/alloys with other additives such as, and without being limitative, binding agents, lubricants, ceramics nanoparticles, and the like.

According to another general aspect, there is provided a metal powder-based manufacturing system comprising: a sealed vessel defining a manufacturing chamber; a metal transformation/conversion unit contained in the manufacturing chamber and configured to heat a metal-based feedstock for transformation/conversion; an inert gas source in gas communication with the manufacturing chamber to supply inert gas therein, the inert gas source being operatively connected to the manufacturing chamber through an inert gas line; and at least one gas purifying unit in gas communication with the manufacturing chamber to purify the inert gas to obtain a purified inert gas having an oxygen partial pressure below about 100 ppb.

In an embodiment, the metal powder-based manufacturing system further comprises a vacuum unit in gas communication with the manufacturing chamber to create a substantial vacuum therein.

In an embodiment, the metal transformation/conversion unit comprises at least one of an additive manufacturing unit, a metal-based powder manufacturing unit, a powder metallurgy unit, and a sintering furnace.

In an embodiment, the metal transformation/conversion unit is configured to melt the metal-based feedstock and solidify the melted metal into at least one resultant 3D part. The at least one resultant 3D part can comprise a plurality of powder particles.

In an embodiment, the metal transformation/conversion unit is configured to heat the metal-based feedstock to a temperature below its melting point and cool down the heated metal into at least one resultant 3D part.

In an embodiment, the inert gas source comprises at least one of an argon gas source, a nitrogen source, and a helium gas source.

In an embodiment, at least one of the at least one gas purifying unit is mounted to the inert gas line, downstream of the inert gas source, to purify the inert gas supplied by the inert gas source to the purified inert gas having an oxygen partial pressure below about 100 ppb before being introduced into the manufacturing chamber. The metal powder-based manufacturing system can further comprise a heating unit mounted to the inert gas line, downstream of the at least one gas purifying unit configured to heat the purified inert gas before being introduced into the manufacturing chamber.

In an embodiment, the metal powder-based manufacturing system further comprises: a recirculatory scrubbing system including a closed-loop recirculation gas line extending between a recirculatory gas inlet port and a recirculatory gas outlet port defined in the vessel and in gas communication with the manufacturing chamber; and at least one of the at least one gas purifying unit mounted to the a closed-loop recirculation gas line and in gas communication therewith to purify the inert gas flowing therein to the purified inert gas having an oxygen partial pressure below about 100 ppb. The recirculatory scrubbing system can further comprise a heat exchanger. The heat exchanger can be mounted upstream to the at least one purifying unit to cool down the inert gas flowing in the recirculation gas line. The recirculatory scrubbing system can further comprise a heating unit mounted downstream of the at least one purifying unit to heat the inert gas flowing in the recirculation gas line before being introduced in the manufacturing chamber. The recirculatory scrubbing system can further comprise a gas compressor mounted to the recirculation gas line. The metal powder-based manufacturing system can further comprise an oxygen-related sensor assembly monitoring an oxygen-related parameter in the manufacturing chamber and a controller operatively connected to the gas compressor and the oxygen-related sensor assembly and varying a speed of the gas compressor based on the oxygen-related parameter monitored by the oxygen sensor assembly. The oxygen-related sensor assembly can comprise an oxygen sensor assembly and the oxygen-related parameter can be the oxygen partial pressure. The oxygen-related sensor assembly can comprise a ppm oxygen sensor and a ppb oxygen sensor wherein the ppb oxygen sensor is operative when a monitored oxygen content is below a ppm detection threshold.

In an embodiment, the oxygen partial pressure of the purified inert gas is below about 50 ppb or below about 20 ppb.

In an embodiment, the metal powder-based manufacturing system further comprises a heating unit located one of inside the manufacturing chamber and in conductive heat exchange therewith to heat the inert gas contained inside the manufacturing chamber.

In an embodiment, the at least one gas purifying unit comprise a gas impermeable housing containing a sorption agent.

According to another general aspect, there is provided a process for transforming/converting metal. The process comprises: supplying inert gas to a gas purifying unit to lower its oxygen partial pressure below about 100 ppb to obtain a purified inert gas; introducing the purified inert gas into a manufacturing chamber defined in a sealed vessel and containing a metal transformation/conversion unit; and heating a metal-based feedstock with the metal transformation/conversion unit to transform/convert the metal-based feedstock into at least one resultant part in the manufacturing chamber containing the purified inert gas.

In an embodiment, the process further comprises withdrawing gas from the manufacturing chamber to a substantial vacuum before introducing the purified inert gas into the manufacturing chamber.

In an embodiment, the steps of supplying inert gas and introducing the purified inert gas comprise: supplying the inert gas into the manufacturing chamber; monitoring an oxygen partial pressure in the manufacturing chamber; while the oxygen partial pressure is above about 200 ppb in the manufacturing chamber, continuously: withdrawing the inert gas from the manufacturing chamber, purifying the withdrawn inert gas to lower its oxygen partial pressure to an oxygen partial pressure below about 100 ppb to obtain the purified inert gas, and then, introducing the purified inert gas into the manufacturing chamber.

In an embodiment, the purified inert gas is introduced into the manufacturing chamber under substantial vacuum through an inert gas line extending between an inert gas source and the manufacturing chamber and having the gas purifying unit mounted thereto and in gas communication therewith. The process can further comprise heating the purified inert gas before being introduced into the manufacturing chamber.

In an embodiment, heating a metal-based feedstock comprises melting the metal-based feedstock. In another embodiment, heating a metal-based feedstock comprises heating the metal-based feedstock to a temperature below its melting point.

In an embodiment, supplying inert gas comprises supplying at least one of an argon gas, a nitrogen gas and a helium gas.

In an embodiment, the process further comprises: withdrawing continuously the inert gas from the manufacturing chamber while heating the metal-based feedstock; purifying the withdrawn inert gas to lower its oxygen partial pressure to an oxygen partial pressure below about 100 ppb, and then, introducing the purified inert gas into the manufacturing chamber. The process can further comprise monitoring an oxygen-related parameter in the manufacturing chamber; and adjusting a flowrate of the inert gas withdrawn from the manufacturing chamber based on the monitored oxygen-related parameter in the manufacturing chamber. In an embodiment, up to 100% (vol.) of a total gas volume contained in the manufacturing chamber is withdrawn per minute. In an embodiment, the withdrawn inert gas is cooled down before being purified. In an embodiment, the purified inert gas is heated before being introduced into the manufacturing chamber.

In an embodiment, the oxygen partial pressure of the purified inert gas exiting the gas purifying unit is below about 50 ppb or below about 20 ppb.

In an embodiment, the process further comprises heating the inert gas contained in the manufacturing chamber.

In an embodiment, the process further comprises, while heating the metal-based feedstock, continuously venting gas contained in the manufacturing chamber and supplying inert gas to the gas purifying unit and introducing the purified inert gas into the manufacturing chamber.

According to a further general aspect, there is provided a process for transforming/converting metal. The process comprises: monitoring an oxygen-related parameter in a manufacturing chamber defined in a sealed vessel; if and while the oxygen-related parameter is above a predetermined oxygen threshold in the manufacturing chamber, continuously: withdrawing the inert gas from the manufacturing chamber, purifying the withdrawn inert gas to lower its oxygen partial pressure to an oxygen partial pressure below about 100 ppb to obtain a purified inert gas, and introducing the purified inert gas into the manufacturing chamber; and if the oxygen-related parameter is below or equal to the predetermined oxygen threshold in the manufacturing chamber, heating a metal-based feedstock with a metal transformation/conversion unit contained in the manufacturing chamber to transform/convert the metal-based feedstock into at least one resultant part. The oxygen-related parameter can be the oxygen partial pressure and the predetermined oxygen threshold can be about 200 ppb.

In an embodiment, the process further comprises, before withdrawing continuously the inert gas from the manufacturing chamber: withdrawing gas from the manufacturing chamber to a substantial vacuum; and supplying the inert gas into the manufacturing chamber from an inert gas source. Supplying the inert gas into the manufacturing chamber can further comprise supplying the inert gas to a gas purifying unit to lower its oxygen partial pressure to an oxygen partial pressure below about 100 ppb before introducing the inert gas into the manufacturing chamber. In an embodiment, the process can further comprise heating the purified inert gas before being introduced into the manufacturing chamber.

In an embodiment, heating a metal-based feedstock comprises melting the metal-based feedstock. In another embodiment, heating a metal-based feedstock comprises heating the metal-based feedstock to a temperature below its melting point.

In an embodiment, supplying inert gas comprises supplying at least one of an argon gas, a nitrogen gas and a helium gas.

In an embodiment, the process further comprises: withdrawing continuously the inert gas from the manufacturing chamber while heating the metal-based feedstock; purifying the withdrawn inert gas to lower its oxygen partial pressure to an oxygen partial pressure below about 100 ppb; and then, introducing the purified inert gas into the manufacturing chamber. The process can further comprise adjusting a flowrate of the inert gas withdrawn from the manufacturing chamber based on the monitored oxygen-related parameter in the manufacturing chamber. In an embodiment, the withdrawn inert gas is cooled down before being purified. In embodiment, the purified inert gas is heated before being introduced into the manufacturing chamber.

In an embodiment, the oxygen partial pressure of the purified inert gas exiting the gas purifying unit is below about 50 ppb or below about 20 ppb.

In an embodiment, the process further comprises heating the inert gas contained in the manufacturing chamber.

In an embodiment, the process further comprises, while heating the metal-based feedstock, continuously venting gas contained in the manufacturing chamber and supplying inert gas to the gas purifying unit and introducing the purified inert gas into the manufacturing chamber.

Still according to another general aspect, there is provided a process for transforming/converting metal. The process comprises: introducing inert gas into a manufacturing chamber defined in a sealed vessel and containing a metal transformation/conversion unit; purifying the inert gas at least one of before introduction into the manufacturing chamber and following introduction into the manufacturing chamber to lower an oxygen partial pressure below about 100 ppb to obtain a purified inert gas; introducing the purified inert gas into the manufacturing chamber; and heating a metal-based feedstock with the metal transformation/conversion unit to transform/convert the metal-based feedstock into at least one resultant part in the manufacturing chamber containing the purified inert gas.

In an embodiment, the process further comprises withdrawing gas from the manufacturing chamber to a substantial vacuum before introducing the inert gas into the manufacturing chamber.

In an embodiment, the process further comprises monitoring an oxygen-related parameter in the manufacturing chamber; and wherein introducing the purified inert gas into the manufacturing chamber is carried out until the oxygen-related parameter in the manufacturing chamber is below a predetermined oxygen threshold. The oxygen-related parameter can be the oxygen partial pressure and the predetermined oxygen threshold can be about 200 ppb.

In an embodiment, purifying the inert gas is carried out following introduction into the manufacturing chamber and comprises continuously: withdrawing the inert gas from the manufacturing chamber, purifying the withdrawn inert gas to lower its oxygen partial pressure to an oxygen partial pressure below about 100 ppb and obtain the purified inert gas, and then, introducing the purified inert gas into the manufacturing chamber.

In an embodiment, purifying the inert gas is carried out before introduction into the manufacturing chamber through an inert gas line extending between an inert gas source and the manufacturing chamber and having a gas purifying unit mounted thereto and in gas communication therewith. The process can further comprise heating the purified inert gas before being introduced into the manufacturing chamber.

In an embodiment, heating a metal-based feedstock comprises melting the metal-based feedstock. In another embodiment, heating a metal-based feedstock comprises heating the metal-based feedstock to a temperature below its melting point.

In an embodiment, supplying inert gas comprises supplying at least one of an argon gas, a nitrogen gas and a helium gas.

In an embodiment, the process further comprises: withdrawing continuously the inert gas from the manufacturing chamber while heating the metal-based feedstock; purifying the withdrawn inert gas to lower its oxygen partial pressure below about 100 ppb, and then, introducing the purified inert gas into the manufacturing chamber. The process further comprises monitoring an oxygen-related parameter in the manufacturing chamber; and adjusting a flowrate of the inert gas withdrawn from the manufacturing chamber based on the monitored oxygen-related parameter in the manufacturing chamber. In an embodiment, the withdrawn inert gas is cooled down before being purified. In embodiment, the purified inert gas is heated before being introduced into the manufacturing chamber. In an embodiment, the oxygen partial pressure of the purified inert gas exiting the gas purifying unit is below about 50 ppb or below about 20 ppb.

In an embodiment, the process further comprises heating the inert gas contained in the manufacturing chamber.

In an embodiment, the process further comprises, while heating the metal-based feedstock, continuously venting gas contained in the manufacturing chamber and supplying inert gas to the gas purifying unit and introducing the purified inert gas into the manufacturing chamber.

In this specification, the term "metal powder-based manufacturing process and system" is intended to include any manufacturing process and system including metal powder, either as metal source (or feedstock) or as resultant part. It includes manufacturing processes and systems wherein metal-based powder is manufactured as resultant part. It also includes manufacturing processes and systems wherein metal-based powder, as metal source/metal-based feedstock, is converted/transformed into a desired final 3D shape/object/part (i.e. resultant part), including powder metallurgy and additive manufacturing. The final 3D shape/object/part can be a single object/part or can be a plurality of individual particles forming together a powder.

In this specification, the term "additive manufacturing" is intended to include binder jetting, laser sintering, powder bed fusion, direct energy deposition, material extrusion, and the like and any combination of these techniques together or with another technology.

For the purpose of this disclosure, a "high purity" gas means a gas having individual contaminant levels of less than about 100 ppb (parts per billion). Furthermore, when referring to an oxygen partial pressure (or to another contaminant partial pressure), it is appreciated that it can be measured directly, for instance through an oxygen sensor or an oxygen sensor assembly, or indirectly through another variable from which the oxygen or the contaminant level can be derived or estimated.

The present document refers to a number of documents, the contents of which are hereby incorporated by reference in their entirety.

BRIEF DESCRIPTION OF THE DRAWINGS

It will be noted that, throughout the appended drawings, like features are identified by like reference numerals.

DETAILED DESCRIPTION

Figure 1:
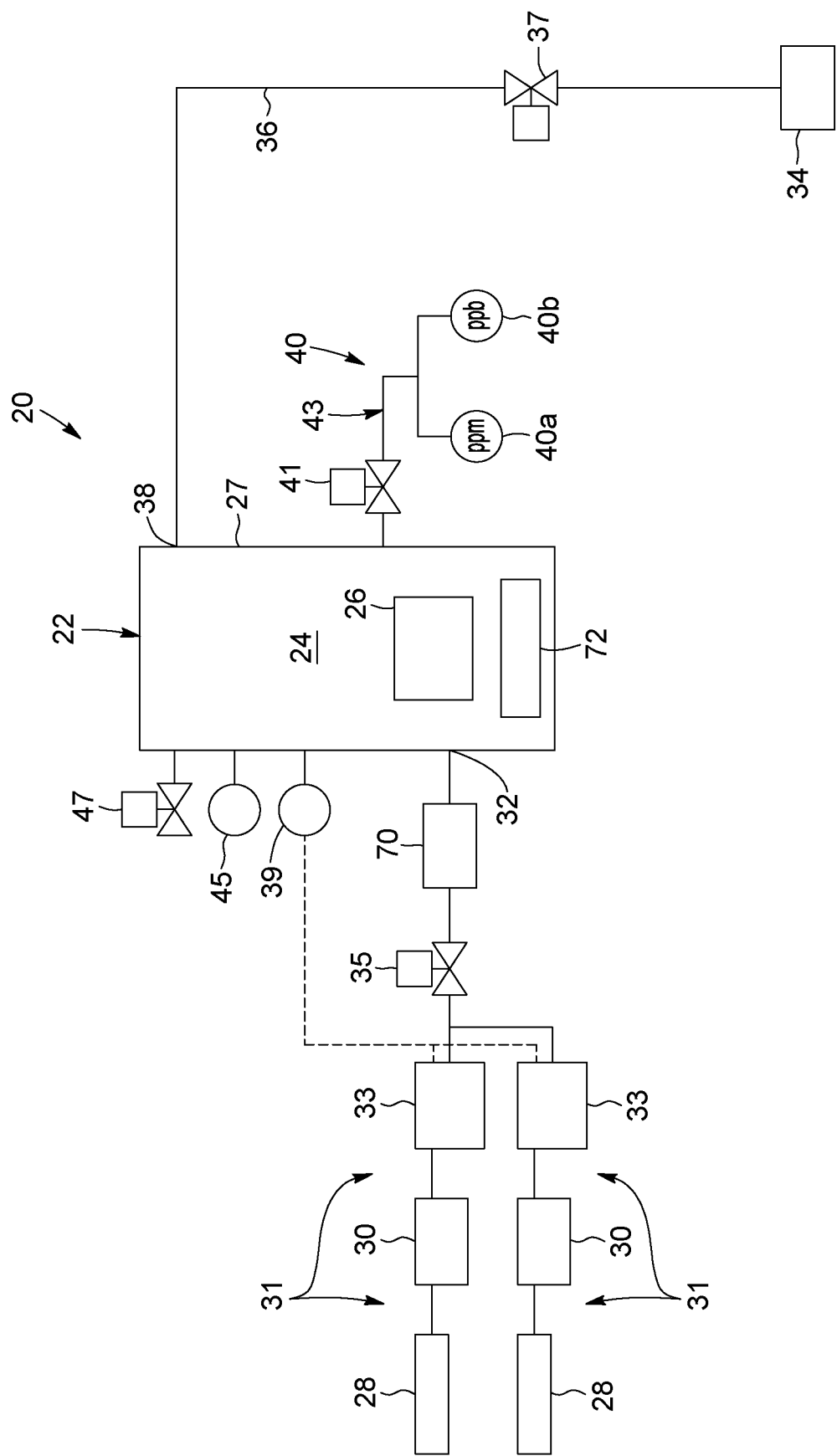
FIG. 1 is a process flow diagram of a metal powder-based manufacturing system in accordance with a first embodiment.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. Furthermore, it is to be understood that the invention can be carried out or practiced in various ways and that the invention can be implemented in embodiments other than the ones outlined in the description above.

It is to be understood that the phraseology and terminology employed herein is not to be construed as limiting and are for descriptive purposes only. Meanings of technical and scientific terms used herein are to be commonly understood as by one of ordinary skill in the art to which the invention belongs, unless otherwise defined.

The principles and uses of the teachings of the present invention may be better understood with reference to the accompanying description, figures and examples. It is to be understood that the details set forth herein do not construe a limitation to an application of the invention.

It is to be understood that the terms "including", "comprising", "consisting" and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

In the following description, the term "about" means within an acceptable error range for the particular value as determined by one of ordinary skill in the art, which will depend in part on how the value is measured or determined, i.e. the limitations of the measurement system. It is commonly accepted that a 10% precision measure is acceptable and encompasses the term "about".

Referring now to FIG. 1, there is shown an embodiment of a metal powder-based manufacturing system 20, which can be used to either produce metal-based powder or convert/transform metal-based powder into a bulkier 3D object/part (i.e. a part or an object bigger than a single particle), by either powder metallurgy or additive manufacturing. In the metal powder-based manufacturing system 20, a metal source (or feedstock) is heated close to or above its melting point, and then cooled down or solidified in order to create a desired final 3D shape or at least one resultant 3D part. As mentioned above, the final 3D shape or the at least one resultant 3D part can be a single object/part or can be a plurality of individual metal-based particles forming together a powder (also referred to herein as metal powder or metal-based powder).

The manufacturing system 20 includes a vessel 22 with walls 27 defining a manufacturing chamber 24. The chamber 24 is configured to receive a metal transformation/conversion unit 26 therein. The vessel 22 is sealed to substantially prevent gas leakage and entry through its walls 27. Therefore, gas communication is solely possible through specific gas inlet(s)/outlet(s), as will be described in more details below. The manufacturing system 20 is configured to maintain a low impurity gas atmosphere within the manufacturing chamber 24, as will be described in more details below. In some embodiments, the gas atmosphere within the manufacturing chamber 24, at least with respect to the impurity content, can even be controlled or regulated.

Gas impurities (or contaminants) include at least one of oxygen, moisture, nitrogen and other non-metallic elements such as carbon monoxide, hydrocarbons (including methane), and the like, which can interact with heated/molten metal and be detrimental to the properties of the resultant part(s). In this specification, the gas purity is intended to mean the content of impurities within the gas atmosphere. A gas purity can be determined in term of a particular impurity content or a total impurity content. For instance, a gas purity in terms of its oxygen content can be measured in terms of the oxygen partial pressure. The gas purity could also be determined in terms of its total impurity content for selected impurities (for instance, for oxygen, moisture and nitrogen).

The metal transformation/conversion unit 26 can include a metal-based powder manufacturing unit, a powder metallurgy unit, and/or an additive manufacturing unit, wherein metal-based feedstock is heated close to or above its melting point, and then cooled down or solidified in order to create a desired final 3D part, which can be either individual powder particles or a consolidated bulk 3D form (or final 3D part/object). Thus, in the metal transformation/conversion unit 26, the metal-based feedstock is transformed or converted into another shape, with or without additional element(s), such as, and without being limitative, binding agents, lubricants, ceramic nanoparticles, being added.

In a non-limitative embodiment, the metal transformation/conversion unit 26, housed in the sealed vessel 22, is a metal-based powder manufacturing unit configured to atomize metal into metal-based powder particles (also referred to herein as metal-based particles or powder particles). In the description, the term particle can be understood herein as corresponding to a particle of powder or powder particle having a mean diameter ranging between about 10 μm and about 125 μm, as readily used in the field of powder metallurgy or powder-based additive manufacturing.

The metal-based powder manufacturing unit is configured to, sequentially, melt metal-based source material (or feedstock), break the molten metal into very fine droplets, and then carry out a solidification of those droplets into powder particles.

In another non-limitative embodiment, the metal transformation/conversion unit 26, housed in the sealed vessel 22, is a 3D printer used to produce consolidated bulk 3D forms. The 3D printer is configured to successively melt thin layers of metal-based powder to build a final 3D part. It is appreciated that the additives such as binders can be added during the printing process.

In another non-limitative embodiment, the metal transformation/conversion unit 26, housed in the sealed vessel 22, is a sintering furnace wherein compacted metal-based powder is heated, close to the melting point, to promote diffusion within the particles and form bonds therebetween to obtain a solid material mass (or a final 3D part/object).

The manufacturing system 20 further includes one or more inert gas supplies 28, such as argon, nitrogen or helium gas supplies, and one or more gas purifying units 30 in gas communication with the chamber 24 through an inert gas line 31. As will be described in more details below, in the gas purifying unit 30, the gas supplied by the inert gas source (or supply) 28 is further purified to remove impurities before being injected into the chamber 24. In the embodiment shown in FIG. 1, the manufacturing system 20 includes two inert gas supplies 28, each one containing a different inert gas, and two gas purifying units 30, each one being associated and in gas communication with a respective one of the inert gas supplies 28. As the two inert gas supplies 28 and the gas purifying units 30 are similar, only one set of inert gas source 28/purifying unit 30 will be described below.

The gas purifying unit 30 is mounted downstream of the inert gas source 28, with respect to the chamber 24. Therefore, the inert gas line 31 comprises a plurality of consecutive inert gas conduits extending between two units in gas communication. For instance, a first inert gas conduit extends between the inert gas source and the gas purifying unit 30 in gas communication therewith.

The gas purifying unit 30 is configured to purify an inert gas flow (nitrogen, argon or other noble gases) from oxygen, moisture, and optionally carbon monoxide, hydrocarbons (including methane) and some other contaminants. The gas purifying unit 30 includes an impermeable housing with ports connected to the inert gas line. Suitable filters, a sorption agent (or metal getter), and optionally a catalyst are contained inside the purifying unit housing. For instance, gas purifying units such as GateKeeper® Inert Gas Purifiers by Entegris, Gaskleen® II Purifier by Pall, Eliminator® by NuPure Corporation, U.S. Pat. No. 5,902,561, which is incorporated herein by reference, etc. can be used.

In an embodiment, the gas purifying unit 30 operates at ambient (room) temperature and processes a continuous gas flow.

In an embodiment, the sorption agent contained in the purifying unit housing can include a porous body at least partially made from transition metals and/or zeolites. In another embodiment, the sorption agent includes powders of reactive alloys.

In an embodiment, the gas purity exiting the purifying unit 30 is below about 100 ppb for at least one contaminant, in another embodiment, the gas purity is below about 50 ppb, and still in another embodiment, the gas purity is below about 10 ppb.

In the non-limitative embodiment shown, the manufacturing system 20 further includes a mass flow controller 33, in gas communication with the gas purifying unit 30, mounted downstream of the gas purifying unit 30. In the embodiment shown, each inert gas line 31 includes its own mass flow controller 33. The mass flow controller 33 is configured to measure and control the flow of gas through the inert gas line 31. As it is known in the art, the set-point of the mass flow controller 33 can be modified to adjust and control the flowrate of the inert gas introduced into the manufacturing chamber 24.

In the embodiment shown in FIG. 1, the inert gases outputted from the two mass flow controllers 33 are combined before being introduced into the manufacturing chamber 24 of the vessel 22, thereby reducing the number of gas inlet port defined in the vessel walls 27 and therefore the potential gas leakages from the chamber 24. A controllable valve 35 is mounted to the single inert gas line 31 extending downstream of the mass flow controllers 33 and in gas communication with the manufacturing chamber 24 of the vessel 22. More particularly, the inert gas line 31 is connected to the vessel 22 through an inert gas inlet port 32 defined in the vessel wall 27.

In the embodiment shown in FIG. 1, the manufacturing system 20 is shown with two inert gas lines 31 extending substantially in parallel and upstream of the controllable valve 35, each one including a single inert gas source 28 and a single gas purifying unit 30. However, it is appreciated that, in alternative embodiment(s) (not shown), the manufacturing system 20 can include a single inert gas line including a single inert gas source 28 and one or more single gas purifying units 30, or more than one inert gas supplies 28 supplying gas flowing into a single gas purifying unit 30, mounted downstream of the more than one inert gas supplies 28. For instance and without being limitative, if the manufacturing system 20 includes a single inert gas line, the system 20 can include only one of the mass flow controller 33 and the controllable valve 35.

It is also appreciated that the manufacturing system 20 can include more than two inert gas supplies 28 and/or gas purifying units 30 which can be configured either in parallel or in series. When configured in parallel, the inert gas conduits can be connected either upstream the gas purifying unit 30 (if the system includes less gas purifying unit(s) 30 than inert gas supplies 28) or downstream thereof. Furthermore, each one of the gas purifying units 30 can include its respective inert gas conduit connected to its respective inert gas inlet port 32 defined in the vessel wall 27, i.e. the vessel 22 can be provided with more than one inert gas inlet port 32.

In the embodiment shown in FIG. 1, the manufacturing system 20 further includes a gas heating unit 70, such as, and without being limitative a heat exchanger (e.g. indirect heat exchanger), mounted downstream of the controllable valve 35, i.e. between the controllable valve 35 and the inert gas inlet port 32. It is appreciated that the gas heating unit 70 could be provided on the inert gas line 31, upstream of the controllable valve 35, for instance. The manufacturing system 20 can also be free of gas heating unit 70 between the inert gas supply(ies) (or source(s)) 28 and the at least one inert gas inlet port 32. Thus, when actuated, the gas heating unit 70 is configured to heat the purified inert gas prior to its introduction into the manufacturing chamber 24. As it is known in the art, the gas heating unit 70 may be controlled to adjust and control the temperature of the inert gas being introduced into the manufacturing chamber 24. The temperature of the inert gas prior to being introduced into the manufacturing chamber 24 can be referred to as the inlet temperature of the inert gas. The gas heating unit 70 can include a gas heater actuator operatively connected to a controller, which in turn can be operatively connected to one or more temperature sensors mounted to the inert gas line 31 and/or inside the manufacturing chamber 24. For example and without being limitative, liquid/gas or discontinuous (or intermittent) heat exchangers, such as regenerative heat exchangers, can be used.

In the embodiment shown in FIG. 1, the manufacturing system 20 also includes a vacuum unit 34, such as a vacuum pump, in gas communication with the chamber 24 through a vacuum gas line 36 having a controllable valve 37 mounted thereto and one port connected to a vacuum port 38 defined in the vessel wall 27.

The manufacturing system 20 further includes a monitoring assembly including pressure sensor(s) 39, temperature sensor(s) (153 in FIG. 2) and oxygen sensor(s) 40a and 40b operatively connected to the vessel 22 and monitoring respectively pressure, temperature and oxygen contents inside the chamber 24. It is appreciated that the manufacturing system 20 can include more or less sensors than the non-limitative embodiment shown in FIG. 1.

In the non-limitative embodiment shown in FIG. 1, the pressure sensor 39 is a pressure sensor controller operatively connected to and in data communication with the two mass flow controllers 33. In FIG. 1, data communication is represented by dash lines. Therefore, the inert gas flowrate (s) introduced into the chamber 24 can be adjusted and controlled based on/in response to pressure data monitored in the chamber 24 by the pressure sensor 39.

In the embodiment shown, an oxygen sensor assembly 40 operatively connected to the vessel 22 for monitoring oxygen content inside the manufacturing chamber 24 includes two oxygen sensors. The oxygen sensor assembly can include a first (ppm) oxygen sensor 40a being operative to measure relatively high oxygen content (measured in ppm), and a second (ppb) oxygen sensor 40b being operative to measure relatively low oxygen content, i.e. when the oxygen content is measurable in ppb. To protect the low content oxygen sensor 40b, this sensor is operative solely when the oxygen content is below the ppm detection threshold. In the embodiment shown, a valve 41 is mounted on a gas line 43 extending between the oxygen sensor assembly 40 and the manufacturing chamber 24. The valve 41 is configured in a closed configuration when the vacuum unit 34 is operating to vacuum the manufacturing chamber 24, as will be described in more details below. The valve 41 is configured in an open configuration when the metal transformation/conversion unit 26 is operating.

In an alternative embodiment of the manufacturing system (not shown), the system includes only one oxygen sensor, for instance the low content oxygen sensor 40b, configured to monitor the oxygen content to a ppb level.

It is appreciated that the oxygen sensor assembly can be replaced or used in combination with another sensor assembly from which information related to the oxygen content in the manufacturing chamber 24 can be derived. For instance and without being limitative, the oxygen content could be derived or estimated from a nitrogen sensor assembly and/or a moisture sensor assembly and/or a carbon dioxyde sensor assembly. All these sensor assemblies could be used in combination and/or in replacement of the oxygen sensor assembly.

In the embodiment shown in FIG. 1, the manufacturing system 20 further includes a pressure safety valve 45 and a chamber refilling valve 47. Both valves 45, 47 are operatively connected to the vessel 22 and in gas communication with the manufacturing chamber 24. The chamber refilling valve 47 is configured in a closed configuration when the metal transformation/conversion unit 26 housed in the sealed vessel 22 is operating. At the end of the metal transformation/conversion operation, the chamber refilling valve 47 is configured in an open configuration to refill the manufacturing chamber 24 with ambient air.

In another non-limitative embodiment wherein the manufacturing chamber 24 is continuously supplied in purified inert gas, the chamber refilling valve 47 can be configured in at least partially open configuration. Thus, the manufacturing chamber 24 can slowly vent gas to the ambient environment at rate that could be metered through valve 47. In such embodiment, the pressure inside the manufacturing chamber 24 should be maintained slightly above the ambient pressure.

In the embodiment shown in FIG. 1, the manufacturing system 20 further includes a heating unit 72 located inside the manufacturing chamber 24. Instead of being located inside the manufacturing chamber 24, the heating unit 72 could be located in proximity thereto. The heating unit 72, which can be a heat exchanger, is configured to heat the ambient and purified inert gas contained in the chamber 24. As the gas heating unit 70, the heating unit 72 may be controlled to adjust and control the temperature of the inert gas contained in the manufacturing chamber 24. It can include a gas heater actuator operatively connected to a controller, which in turn can be operatively connected to one or more temperature sensors configured to sense the gas temperature inside the chamber 24. It is appreciated that, in an alternative embodiment (not shown), the manufacturing system 20 could be free of heating unit inside or in proximity of the manufacturing chamber 24.

Figure 2:
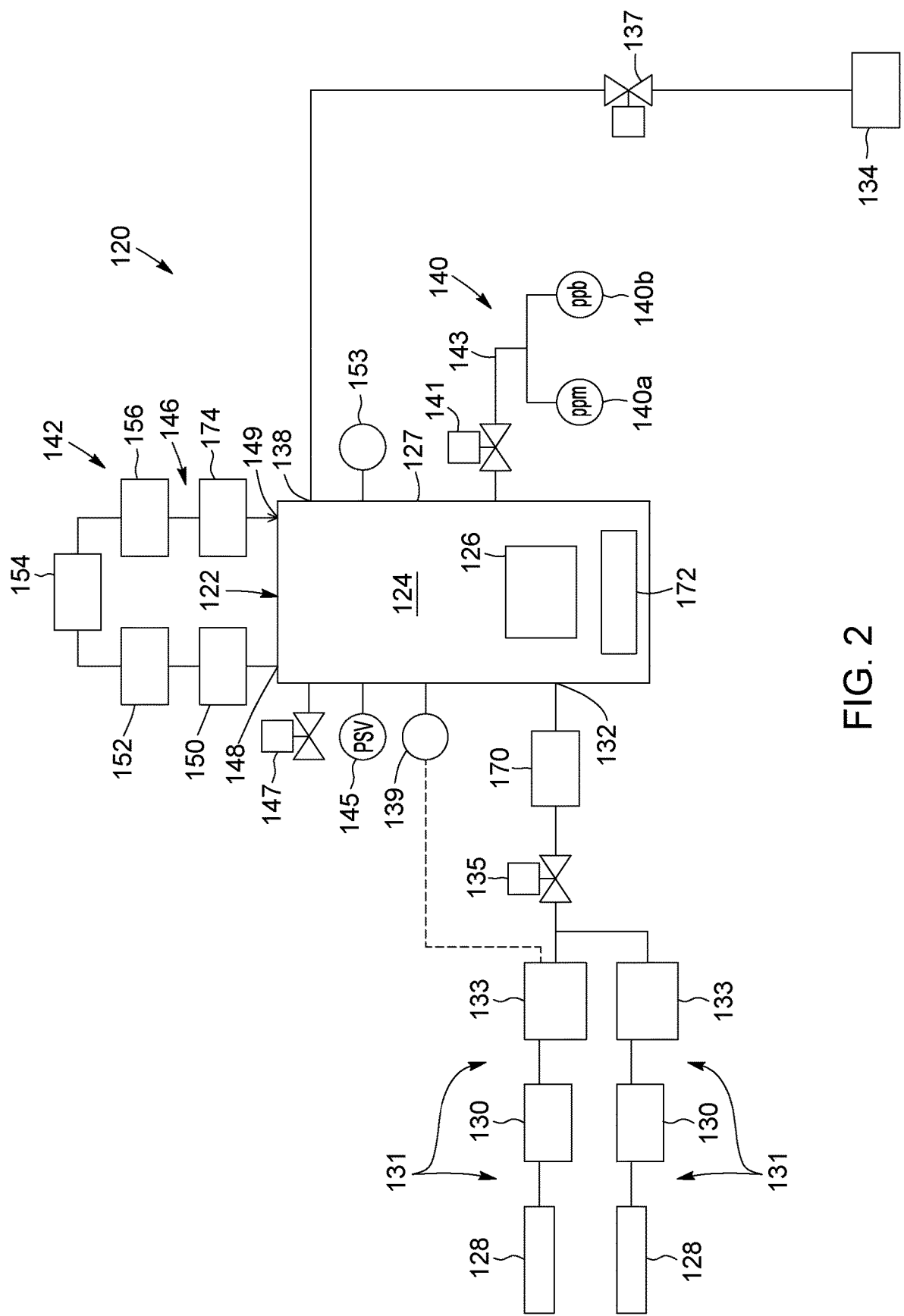
FIG. 2 is a process flow diagram of a metal powder-based manufacturing system in accordance with a second embodiment including a recirculatory gas stream.

Referring now to FIG. 2, there is shown an alternative embodiment of the manufacturing system 20 wherein the features are numbered with reference numerals in the 100 series which correspond to the reference numerals of the previous embodiment. In this embodiment, the manufacturing system 120 further includes a recirculatory scrubbing system 142 with the other features of the manufacturing system 120 being similar to the manufacturing system 20.

The recirculatory scrubbing system 142 comprises a closed-loop recirculation gas line 146 with a recirculatory gas inlet port 148 and a recirculatory gas outlet port 149 defined in the vessel wall 127 and in gas communication with the manufacturing chamber 124. The recirculatory scrubbing system 142 includes, sequentially along the closed-loop recirculation gas line 146 from the recirculatory gas inlet port 148 to the recirculatory gas outlet port 149, a filtering unit 150, a compressor 152, a heat exchanger 154 to cool the gas circulating in the gas line 146, and a gas purifying unit 156, which is similar to the gas purifying units 30, 130 detailed above. The recirculatory scrubbing system 142 creates a continuous gas stream that circulates within the closed-loop recirculation gas line 146 and the gas purifying unit 156. In the embodiment shown, the heat exchanger 154 is designed to remove heat added to the gas circulating in the gas line 146 by compression in the gas compressor 152 and generated by the melted metal process inside the manufacturing chamber 124.

It is appreciated that, in alternative embodiments (not shown), at least one of the filtering unit 150 and the heat exchanger 154 could be omitted.

In the embodiment shown, the recirculatory scrubbing system 142 further includes a heating unit 174, such as, and without being limitative, a heat exchanger, mounted downstream of the gas purifying unit 156, i.e. between the gas purifying unit 156 and the inert gas inlet port 149. It is appreciated that the gas heating unit 149 could be provided at another suitable location along the gas line 146. Thus, when actuated, the gas heating unit 174 is configured to heat the purified inert gas prior to its introduction into the manufacturing chamber 124. As it is known in the art, the gas heating unit 174 may be controlled to adjust and control the temperature of the inert gas being introduced into the manufacturing chamber 124. It can include a gas heater actuator operatively connected to a controller, which in turn can be operatively connected to one or more temperature sensors mounted to the inert gas line 146 and/or inside the manufacturing chamber 124. The recirculatory scrubbing system 142 can also be free of the gas heating unit 174.

The purpose of the recirculatory scrubbing system 142 is to continuously purify the gas atmosphere inside the manufacturing chamber 124 during the manufacturing process by removing or minimizing the impurities content. Even though the inert gas(es) introduced in the manufacturing chamber 124 are purified by the gas purifying unit(s) 130 before introduction into the manufacturing chamber 124, oxygen and other gas contaminants can diffuse in the manufacturing chamber 124 and, thereby, increase the impurity content of the gas contained in the manufacturing chamber 124. Therefore, the recirculatory scrubbing system 142 creates a recirculatory gas stream, where a percentage of the gas content of the manufacturing chamber 124 is bled off and purified before being reintroduced. With the recirculatory scrubbing system 142, the inert gas content of the manufacturing chamber 124 is continuously scrubbed from oxygen and other impurities that diffuse into the manufacturing chamber 124 of the vessel 122.

In some implementations up to 100% (vol.) of total gas volume per minute, i.e. the gas volume contained in the manufacturing chamber 124, is recycled, i.e. withdrawn from the chamber 124, sent to the gas purifying unit 156 before being returned to the chamber 124. In other implementations, between 1 and 50% (vol.) (or between 5 and 20% (vol.) or between 10 and 20% (vol.)) of total gas volume per minute can be recycled through the recirculatory scrubbing system 142. In an alternative embodiment of the system 120, the percentage of gas scrubbed through the recirculatory scrubbing system 142 varies proportional to readings obtained from an oxygen sensor assembly 140.

In some implementations, the manufacturing system 120 can further include a controller (not shown) operatively connected to the oxygen sensor assembly 140 (or an oxygen-related sensor assembly, i.e. a sensor assembly from which the oxygen content can be derived or estimated) and to the compressor 152 of the recirculatory scrubbing system 142. Based on data provided by the oxygen sensor assembly 140, the speed of the compressor 152 is modified to adjust the recycled gas flowrate in the closed-loop recirculation gas line 146. Thereby, the recirculatory gas stream can be increased if the oxygen content in the manufacturing chamber 124 increases, and vice-versa.

In an alternative embodiment (not shown), the inert gas supply(ies) (or source(s)) 128 can be in gas communication with the manufacturing chamber 124 directly, i.e. without any gas purifying unit(s) 130 mounted to the inert gas lines 131, between the inert gas supply(ies) 128 and the manufacturing chamber 124. Therefore, the inert gas supply(ies) 128 can directly fill the manufacturing chamber 124 with non-purified inert gas. The non-purified inert gas can be purified using the recirculatory scrubbing system 142 and, more particularly, the gas purifying unit 156 of the recirculatory scrubbing system 142. Therefore, the recirculatory scrubbing system 142 is operated before carrying out the metal transformation/conversion in the manufacturing chamber 124 to purify the inert gas contained therein. In an embodiment, the recirculatory scrubbing system 142 is operated until the contaminant level of the gas atmosphere in the manufacturing chamber 124 is below a predetermined threshold, such as, and without being limitative, an oxygen partial pressure below 100 ppb.

As the manufacturing system 20, the manufacturing system 120 includes a monitoring assembly including a plurality of actuators and sensors, which can include, but is not limited to, mass flow controllers 133, in gas communication with the inert gas supply(ies) 128 and the gas purifying unit(s) 130, controllable valve(s) 135 mounted to the gas inert line(s) 131, a pressure safety valve 145, a chamber refilling valve 147, pressure sensor(s) 139, temperature sensor(s) 153, and oxygen sensor(s) 140a and 140b operatively connected to the vessel 122 and monitoring respectively pressure, temperature and oxygen content inside the chamber 124. As mentioned for the embodiment shown in FIG. 1, the presence and the configuration of the mass flow controllers 133 and the controllable valve(s) 135 can vary from the embodiment shown.

In the non-limitative embodiment shown, the oxygen sensor assembly 140, mounted to the gas line 143 with a valve 141 located between the sensor assembly 140 and the chamber 124, is similar to the oxygen sensor assembly 40 and includes two oxygen sensors, i.e. a ppm sensor 140a and a ppb sensor 140b. However, it is appreciated that either the system 20 or the system 120 can include a different type of oxygen sensor. As mentioned for the embodiment shown in FIG. 1, the system can include only one oxygen sensor (or oxygen-related sensor), for instance the low content oxygen sensor 40b, configured to monitor the oxygen content to a ppb level and the oxygen sensor assembly can be replaced or used in combination with another sensor assembly from which information related to the oxygen content in the manufacturing chamber 124 can be derived, i.e. from an oxygen-related sensor.

As the manufacturing system 20, the manufacturing system 120 includes a vacuum unit 134, such as a vacuum pump, in gas communication with the chamber 124 through a vacuum gas line 136 having a controllable valve 137 mounted thereto and one port connected to a vacuum port 138 defined in the vessel wall 127. It is appreciated that, in an alternative embodiment (not shown), the vacuum unit 134 (including the vacuum gas line 136 and the controllable valve 137) can be omitted, especially if the system 20, 120 includes a recirculatory scrubbing system 142. Thus, the manufacturing chamber 124 can be supplied with inert gas and the inert gas can be circulated in the recirculatory scrubbing system 142 until the impurity content in the manufacturing chamber 124 is below a impurity threshold. For instance and without being limitative, the inert gas can be circulated in the recirculatory scrubbing system 142 until the oxygen partial pressure in the manufacturing chamber 124 is below about 200 ppb. Then, the metal-based feedstock contained in the manufacturing chamber 124 can be heated by the metal transformation/conversion unit 126.

There is also provided a process for manufacturing/transforming/converting metal using the manufacturing system described in reference to FIGS. 1 and 2, wherein a purity of a gas atmosphere inside the manufacturing chamber 24, 124 of the vessel 22, 122 is monitored and/or controlled during the manufacturing process.

Optionally using the vacuum system 34, 134, the manufacturing chamber 24, 124 is first drawn to vacuum, and then is back-filled with high-purity inert gas, such as argon, nitrogen or helium, using the inert gas supply(ies) 28, 128. Before entering the chamber 24, 124, the inert gas supplied by the inert gas supply(ies) 28, 128 can be purified in the gas purifying unit(s) 30, 130 to reduce the impurity level. In the alternative, the inert gas filing the manufacturing chamber 124 can be purified once it has been supplied to the manufacturing chamber 124 using the recirculatory scrubbing system 142. Thus, in this implementation, the vacuum system could be omitted.

When the manufacturing chamber 24, 124 is first drawn to vacuum, it can be draw to less than about 1200 Pa, alternatively to less than about 100 Pa and, still alternatively to less than about 5 Pa. In a non-limitative implementation, the vacuum system can include two or more vacuum pumps. A first one can be used to draw to less than a first threshold (for instance and without being limitative less than about 5 Pa) and a second one can be used once the first threshold is reached to draw to another threshold (for instance and without being limitative less than about 0.1 Pa).

As mentioned above, the impurity level can be reduced below a predetermined threshold, for instance, and without being limitative, about 200 ppb or to about 100 ppb for at least one contaminant. In another embodiment, the gas purity for at least one contaminant is below about 50 ppb and, still in another embodiment, the gas purity for at least one contaminant is below about 10 ppb. Purification of the inert gas supplied to the manufacturing chamber 24, 124 is required before raising the metal temperature inside the manufacturing chamber 24, 124 to carry out the metal transformation/conversion. Inert gas purification reduces contamination levels in the manufactured powder particles or consolidated bulk 3D form.

During operation of the metal transformation/conversion unit 26, 126, the inert gas content in the manufacturing chamber 24, 124 is typically maintained below about 200 ppb for at least one contaminant level. In another embodiment, the gas purity is below about 100 ppb for at least one contaminant level. The difference between the impurity content of the inert gas exiting the gas purifying unit(s) 30, 130 and the impurity content of the inert gas contained in the manufacturing chamber 24, 124 is mainly due to the oxygen and other impurities that diffuse into the manufacturing chamber 124 of the vessel 122 during operation. As described above, the impurity content of the inert gas contained in the manufacturing chamber 24, 124 can be continuously reduced and/or maintained through the impurity content of the inert gas contained in the manufacturing chamber 24, 124. In some implementations, the impurity content of the inert gas contained in the manufacturing chamber 24, 124 can even be controlled using the oxygen sensor(s) 140 (or oxygen-related sensors) and the compressor 152.

Thus, in one embodiment of the process for transforming/converting metal, inert gas is supplied to a gas purifying unit to lower its oxygen partial pressure below about 100 ppb to obtain a purified inert gas. The purified inert gas into the manufacturing chamber; and then the metal-based feedstock can be heated with the metal transformation/conversion unit to transform/convert the metal-based feedstock into at least one resultant part.

Thus, in another embodiment of the process for transforming/converting metal, an oxygen-related parameter can be monitored in the manufacturing chamber. If and while the oxygen-related parameter is above a predetermined oxygen threshold in the manufacturing chamber, inert gas can be continuously withdrawn from the manufacturing chamber, purified to lower its oxygen partial pressure to an oxygen partial pressure below about 100 ppb to obtain a purified inert gas, and reintroduced as a purified inert gas into the manufacturing chamber. If the oxygen-related parameter is below or equal to the predetermined oxygen threshold in the manufacturing chamber, then the metal-based feedstock contained in the manufacturing chamber can be heated with the metal transformation/conversion unit to transform/convert the metal-based feedstock into at least one resultant part.

In still another embodiment of the process for transforming/converting metal, inert gas can be introduced into a manufacturing chamber defined in a sealed vessel and containing a metal transformation/conversion unit; the inert gas can be purified at least one of before introduction into the manufacturing chamber and following introduction into the manufacturing chamber to lower an oxygen partial pressure below about 100 ppb to obtain a purified inert gas; and the purified inert gas can be into the manufacturing chamber. Then, the metal-based feedstock can be heated with the metal transformation/conversion unit to transform/convert the metal-based feedstock into at least one resultant part.

Optionally, gas contained in the manufacturing chamber can be withdrawn before introducing the purified inert gas into the manufacturing chamber in a manner such that the manufacturing chamber is in a substantial vacuum. Before heating the metal-based feedstock, the gas contained in the manufacturing chamber can be continuously withdrawn, purified, and reintroduced until a monitored oxygen-related parameter in the manufacturing chamber is below a predetermined oxygen threshold. In a non-limitative embodiment, the oxygen-related parameter can be the oxygen partial pressure and the predetermined oxygen threshold can be 200 ppb. In a non-limitative embodiment, the purified inert gas produced by the purifying unit has an oxygen partial pressure below about 100 ppb. Optionally, the purified inert gas can be heated before being introduced into the manufacturing chamber and/or cooled down before being purified.

In an embodiment, the inert gas is introduced into the manufacturing chamber and from the inert gas source(s) as a purified inert gas since the inert gas line extending between the inert gas source(s) and the manufacturing chamber has a gas purifying unit mounted thereto and in gas communication with the inert gas line. Optionally, the purified inert gas can be heated before being introduced into the manufacturing chamber.

Optionally, while the metal-based feedstock is heated with the metal transformation/conversion unit, inert gas contained in the manufacturing chamber can be continuously withdrawn, purified, and reintroduced into the chamber to maintain a low impurity level during the metal transformation/conversion process. In a non-limitative embodiment, the purified inert gas produced by the purifying unit has an oxygen partial pressure below about 100 ppb. Optionally, the purified inert gas can be heated before being reintroduced into the manufacturing chamber and/or cooled down before being purified. Optionally, an oxygen-related parameter can be monitored in the manufacturing chamber; and the flowrate of the inert gas being withdrawn from the manufacturing chamber can be adjusted based on the monitored oxygen-related parameter.

Alternatively and optionally, while the metal-based feedstock is heated with the metal transformation/conversion unit, gas contained in the manufacturing chamber can be continuously and solely withdrawn and vent to the ambient environment, and the manufacturing chamber can be continuously supplied with purified inert gas supplied by the inert gas source(s).

Still optionally, the inert gas contained in the manufacturing chamber while the metal-based feedstock is heated with the metal transformation/conversion unit can be heated.

As mentioned above, in a non-limitative embodiment, the metal transformation/conversion unit 26, 126 housed in the sealed vessel 22, 122 is configured to atomize metal into metal-based particles. In this embodiment, the high-purity atmosphere of the manufacturing chamber 24, 124 assists particle spheroidization and reduces the possibility of oxide or contaminant inclusions.

In still another non-limitative embodiment, the metal transformation/conversion unit 26, 126 housed in the sealed vessel 22, 122 is a sintering furnace or unit used to produce consolidated bulk 3D forms with improved mechanical properties by lowering the oxide formation.

In the non-limitative embodiment where the metal transformation/conversion unit 26, 126 housed in the sealed vessel 22, 122 is a 3D printer used to produce consolidated bulk 3D forms, the high-purity atmosphere of the manufacturing chamber 24, 124 helps to maintain a melt pool uniformity and to reduce formation of oxide or contaminant inclusions in the final 3D part.

It is known that many metals, including aluminum, form oxides that have a much higher melting point than the metal. This means a drop of molten metal can form a rigid shell of oxide, preventing the molten metal from changing shape due to surface tension. This occurs even when the oxide layer is a few angstroms thick, i.e. there are only a few layers of oxide molecules. Due to the highly reactive nature of molten metal, we can assume that any oxygen molecule that hits the molten metal will stick and form oxide. Therefore, the high-purity atmosphere of the manufacturing chamber 24, 124 substantially prevents the oxide formation by limiting the oxygen (and other impurities) content inside the chamber 24, 124 so that a complete layer of oxide cannot form before the droplet fully spheroidizes.

It is known that the time to form a layer is directly related to the pressure of gas. Because the chamber 24, 124 is filled with high-purity inert gases, such as argon, nitrogen or helium, prior to beginning the manufacturing process, the pressure of inert gases can be ignored. Therefore, solely the oxygen partial pressure should be considered when calculating the time to form a monolayer of oxide. In an embodiment, the oxygen partial pressure in the manufacturing chamber 24, 124 should be below about 200 ppb and, in another embodiment, below about 100 ppb.

For instance, and without being limitative, the maximum threshold for the oxygen partial pressure in the manufacturing chamber 24, 124 when the metal transformation/conversion unit 26, 126 housed in the sealed vessel 22, 122 is a metal-based powder manufacturing unit configured to atomize an aluminium into aluminium-based powder can be determined as follows. To ensure manufacturing of substantially spherical powder particles, formation of an oxide monolayer on the powder particles during formation and solidification thereof must be prevented. Lamb (1932) [Lamb, H. 1932, *Hydrodynamics*, 6$^{th}$ edition, Cambridge University Press] estimated the decay time for droplet spheroidization to $$\frac{\rho r^2}{\mu(l-1)(2l+1)}.$$

It is also estimated that 5 decay times are required to eliminate all vibrations. If 50 μm droplets of aluminum are manufactured, the estimated time to eliminate all vibrations to obtain substantially spherical powder particles is about 1100 μs. Therefore, formation of an oxide monolayer on the powder particles during at least 1100 μs should be avoided. For quality control, this estimated time is multiplied by a safety factor (determined empirically). For instance, and without being limitative, a safety factor of 10 can be selected to obtain 11 ms.

Based on Sayer et al. (1999) [SAYER, M. & MANSINGH, A. MEASUREMENT, INSTRUMENTATION AND EXPERIMENT DESIGN IN PHYSICS AND ENGINEERING, PHI Learning, 1999], forming a monolayer at 1 atmosphere partial pressure takes approximately 3 ns, so extending this to 15 ms requires a partial pressure of 200 ppb. A 68 μm droplet may take twice as long to spheroidize, producing a requirement of 100 ppb.

It will be appreciated that the methods/processes described herein may be performed in the described order, or in any suitable order.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. A process for transforming/converting metal, the process comprising:

Introducing an inert gas into a manufacturing chamber defining a total gas volume and being provided in a sealed vessel containing a metal transformation/conversion unit that comprises a metal-based powder manufacturing unit configured to atomize powder particles, wherein the powder particles have a mean diameter ranging between about 10 μm and about 125 μm;

purifying the inert gas at least one of before introduction into the manufacturing chamber and following introduction into the manufacturing chamber to lower an oxygen partial pressure below about 100 ppb to obtain a purified inert gas; introducing the purified inert gas into the manufacturing chamber; and heating a metal-based feedstock with the metal transformation/conversion unit to transform/convert the metal-based feedstock into at least one resultant part in the manufacturing chamber containing the purified inert gas, wherein the process further comprises:

withdrawing continuously between 1 and 50 vol % of the total gas volume per minute of gas from the manufacturing chamber while heating the metal-based feedstock to produce a withdrawn inert gas;

purifying the withdrawn inert gas to lower its oxygen partial pressure below about 100 ppb, and then, introducing the purified inert gas into the manufacturing chamber.

2. The process as claimed in claim 1, further comprising withdrawing gas from the manufacturing chamber to a substantial vacuum before introducing the inert gas into the manufacturing chamber.

3. The process as claimed in claim 2, wherein the oxygen-related parameter is the oxygen partial pressure and the predetermined oxygen threshold is about 200 ppb.

4. The process as claimed in claim 1 further comprising monitoring an oxygen-related parameter in the manufacturing chamber; and wherein introducing the purified inert gas into the manufacturing chamber is carried out until the oxygen-related parameter in the manufacturing chamber is below a predetermined oxygen threshold.

5. The process as claimed in claim 1, wherein purifying the inert gas is carried out before introduction into the manufacturing chamber through an inert gas line extending between an inert gas source and the manufacturing chamber and having a gas purifying unit mounted thereto and in gas communication therewith.

6. The process as claimed in claim 5, wherein the oxygen partial pressure of the purified inert gas exiting the gas purifying unit is below about 50 ppb.

7. The process as claimed in claim 5, wherein the oxygen partial pressure of the purified inert gas exiting the gas purifying unit is below about 20 ppb.

8. The process as claimed in claim 1, wherein heating the metal-based feedstock comprises melting the metal-based feedstock or heating the metal-based feedstock to a temperature below its melting point.

9. The process as claimed in claim 1, further comprising monitoring an oxygen-related parameter in the manufacturing chamber; and adjusting a flowrate of the inert gas withdrawn from the manufacturing chamber based on the monitored oxygen-related parameter in the manufacturing chamber.

10. The process as claimed in claim 1, further comprising heating the inert gas contained in the manufacturing chamber.

11. The process as claimed in claim 1, wherein the purified inert gas is heated before being introduced into the manufacturing chamber.

12. The process as claimed in claim 1, wherein introducing inert gas comprises introducing at least one of an argon gas, a nitrogen gas and a helium gas.

13. The process as claimed in claim 1, wherein the withdrawn gas is cooled down before being purified.

* * * * *